United States Patent
Nakano et al.

(10) Patent No.: US 7,351,754 B2
(45) Date of Patent: Apr. 1, 2008

(54) WATER-BASED INK

(75) Inventors: Yukihiro Nakano, Wakayama (JP); Nobuyuki Takizawa, Wakayama (JP)

(73) Assignee: Kao Corporation, Tokyo (JP)

( * ) Notice: Subject to any disclaimer, the term of this patent is extended or adjusted under 35 U.S.C. 154(b) by 597 days.

(21) Appl. No.: 10/602,614

(22) Filed: Jun. 25, 2003

(65) Prior Publication Data

US 2004/0059019 A1 Mar. 25, 2004

(30) Foreign Application Priority Data

Jun. 25, 2002 (JP) ............................ 2002-184509
Dec. 27, 2002 (JP) ............................ 2002-382309

(51) Int. Cl.
*C08J 3/00* (2006.01)
*C08K 3/20* (2006.01)
*C08L 39/00* (2006.01)
*C09D 5/00* (2006.01)
*C09D 11/00* (2006.01)

(52) U.S. Cl. ................... 523/160; 523/161; 524/555; 524/556; 524/558; 524/559; 524/750; 526/224

(58) Field of Classification Search ............... 523/160, 523/161; 524/555, 556, 558, 559, 750; 526/224
See application file for complete search history.

(56) References Cited

U.S. PATENT DOCUMENTS

| | | | | | |
|---|---|---|---|---|---|
| 3,960,824 | A | * | 6/1976 | Hicks | ........................ 526/85 |
| 4,139,514 | A | * | 2/1979 | Bassett | ...................... 524/824 |
| 5,216,071 | A | | 6/1993 | Hutter et al. | |
| 5,272,201 | A | * | 12/1993 | Ma et al. | .................... 524/505 |
| 6,262,207 | B1 | | 7/2001 | Rao et al. | |
| 6,602,333 | B2 | * | 8/2003 | Miyabayashi | ............ 106/31.27 |
| 6,652,634 | B1 | * | 11/2003 | Akers et al. | ............ 106/31.13 |
| 6,864,302 | B2 | * | 3/2005 | Miyabayashi | ............... 523/160 |
| 6,866,707 | B2 | * | 3/2005 | Kato | ........................ 106/31.6 |
| 2002/0016385 | A1 | * | 2/2002 | Nakano et al. | ............ 523/160 |
| 2002/0077385 | A1 | | 6/2002 | Miyabayashi | |
| 2003/0045627 | A1 | * | 3/2003 | Rosano et al. | ............... 524/547 |
| 2003/0092797 | A1 | * | 5/2003 | Wang et al. | ................ 523/161 |
| 2003/0176533 | A1 | * | 9/2003 | Cottrell et al. | ............. 523/160 |
| 2004/0024085 | A1 | | 2/2004 | Ishizuka et al. | |
| 2005/0261395 | A1 | | 11/2005 | Ishizuka et al. | |

FOREIGN PATENT DOCUMENTS

| | | | |
|---|---|---|---|
| EP | 0 578 498 A2 | | 1/1994 |
| EP | 1059341 A1 | * | 12/2000 |
| EP | 1113051 A1 | * | 7/2001 |
| EP | 1 158 030 | | 11/2001 |
| EP | 1 172 421 A1 | | 1/2002 |
| EP | 1 243 623 A1 | | 9/2002 |
| EP | 1 266 941 A1 | | 12/2002 |
| JP | 56-147868 | | 11/1981 |
| JP | 6-136311 | | 5/1994 |
| JP | 2001-123097 | | 5/2001 |
| JP | A 2001-262039 | | 9/2001 |
| JP | 2002-347338 | | 12/2002 |
| JP | 2003-221521 | | 8/2003 |
| WO | WO 01/30924 A1 | | 5/2001 |

OTHER PUBLICATIONS

Derwent Abstracts, AN 1993-408874, XP-002256607, JP 05-306332, Nov. 19, 1993.
Derwent Abstracts, AN 1979-31909B/197917, JP 54-058504, May 11, 1979.
Derwent Abstracts, AN 1995-380274/199549, JP 7-258591, Oct. 9, 1995.
Derwent Abstracts, AN 1995-390479/199550, JP 7-268260, Oct. 17, 1995.
Derwent Abstracts, AN 2000-550950/200051, JP 2000-239591, Sep. 5, 2000.
Derwent Abstracts, AN 1991-114504/199116, JP 3-056573, Mar. 12, 1991.
Derwent Abstracts, AN 1991-248091/199134, JP 3-160069, Jul. 10, 1991.
Derwent Abstracts, AN 2002-100088/200214, JP 2001-262039, Sep. 26, 2001.
Derwent Abstracts, AN 2001-618266/200172, JP 2001-247796, Sep. 11, 2001.
Derwent Abstracts, AN 1997-418016/199739, JP 9-286939, Nov. 4, 1997.
Derwent Abstracts, AN 2000-482652/200042, WO 2000/ 39226, Jul. 6, 2000.
Database WPI, AN 2001-451343, XP-002256726, WO 01/30924, May 3, 2001.

* cited by examiner

*Primary Examiner*—Patrick Niland
(74) *Attorney, Agent, or Firm*—Oblon, Spivak, McClelland, Maier & Neustadt, P.C.

(57) ABSTRACT

A water-based ink comprising a colorant and a water-insoluble polymer having at least two hydroxyl groups at its end; a water-based ink comprising a water-insoluble polymer having an ionic group at its end and a pigment; and a process for preparing a water-based ink, comprising dissolving a water-insoluble polymer having an ionic group at its end or at least two hydroxyl groups at its end in an organic solvent; adding a pigment, water and a neutralizing agent, and optionally a surfactant to the resulting solution; kneading the mixture to form a paste; diluting the paste with water as occasion demands; and distilling off the organic solvent to make it into a water-based system. The water-based ink can be suitably used for printers for inkjet printing.

12 Claims, No Drawings

WATER-BASED INK

BACKGROUND OF THE INVENTION

1. Field of the Invention

The present invention relates to a water-based ink. More specifically, the present invention relates to a water-based ink which can be suitably used for printers for inkjet printing, and a process for preparing the water-based ink.

2. Discussion of the Related Art

As coloring materials for water-based inks, aqueous dispersions containing a water-soluble dye or pigment have been used. Since the water-soluble dye has a wide range of color tones and is excellent in color reproducibility, the water-soluble dye has been used as a coloring material suitable for photographic printing. On the other hand, since a pigment-containing aqueous dispersion is excellent in weathering resistance, the pigment-containing aqueous dispersion has been used as a coloring material which is suitable for a long-term storage of printouts and outdoor use.

However, there are some disadvantages in using a water-soluble dye, such that the water-soluble dye is deteriorated in water resistance and light fastness, so that the water-soluble dye is likely to be blotted when printed on plain paper. Also, there are some disadvantages in using a pigment-containing aqueous dispersion, such that the pigment-containing aqueous dispersion has worsened fixing ability on paper surface, and deteriorated water resistance, rubbing resistance and high-lighter fastness when a surfactant or a water-soluble polymer is used as a dispersant in order to improve dispersion stability of the pigment. Furthermore, there is a disadvantage in using a pigment-containing aqueous dispersion, such that the pigment-containing aqueous dispersion is more likely to be blotted when printed on plain paper, although not so worse as the water-soluble dye.

Therefore, recently, there have been proposed a technique of containing a polymer emulsion of a water-insoluble polymer in an ink, and a technique of incorporating a dye or pigment into a polymer emulsion.

For instance, Japanese Patent Laid-Open Nos. Sho 54-058504, Hei 7-258591 and Hei 7-268260 disclose the use of fine polymer particles into which a hydrophobic dye is incorporated in order to improve water resistance. Also, Japanese Patent Laid-Open No. 2000-239591 discloses that a polymeric latex is added to an ink in order to improve rubbing resistance. Furthermore, Japanese Patent Laid-Open Nos. Hei 03-056573 and Hei 03-160069 disclose that fine polymer particles are added to an ink for the purpose of improving blotting resistance and fixing ability.

However, there are some disadvantages in using these techniques such that jetting property when jetted with an inkjet printer is insufficient, so that the printouts are likely to become blurry, even though there are certain effects in water resistance, rubbing resistance and blotting resistance.

Japanese Patent Laid-Open No. 2000-239591 discloses that a specialized solvent is further added to an ink in order to improve its jetting property. However, when this solvent is added to the ink, the desired optical density may not be obtained. Therefore, this process is not necessarily effective from the viewpoint of quality of the printed characters.

Japanese Patent Laid-Open No. Hei 03-56573 discloses that fine polymer particles are cross-linked in order to prevent clogging of the nozzles. However, there are some disadvantages in using this technique, such that and the ink fixing abilities such as rubbing resistance are insufficient, even though the cross-linking degree of the fine polymer particles is increased to a certain extent in order to sufficiently improve clogging of the nozzles.

The present invention relates to a water-based ink which is excellent in high-lighter fastness and rubbing resistance.

The present invention also relates to provide a water-based ink which is excellent in jetting property when printed with an inkjet printer.

These and other advantages of the present invention will be apparent from the following description.

SUMMARY OF THE INVENTION

According to the present invention, there are provided:
(1) a water-based ink comprising a colorant and a water-insoluble polymer having at least two hydroxyl groups at its end;
(2) a water-based ink comprising a water-insoluble polymer having an ionic group at its end and a pigment; and
(3) a process for preparing a water-based ink, comprising dissolving particles of water-insoluble polymer having an ionic group at its end or at least two hydroxyl groups at its end in an organic solvent; adding a pigment, water and a neutralizing agent, and optionally a surfactant to the resulting solution; kneading the mixture to form a paste; diluting the paste with water as occasion demands; and distilling off the organic solvent to make it into a water-based system. The water-based ink can be suitably used for printers for inkjet printing.

DETAILED DESCRIPTION OF THE INVENTION

According to the present invention, since a water-insoluble polymer having at least two hydroxyl groups at its end is used in the water-based ink, the water-based ink is excellent in water resistance, high-lighter fastness and rubbing resistance, and also excellent in jetting property and blotting resistance when printed with an inkjet printer.

In a case where a water-insoluble polymer having an ionic group at its end is used, if a pigment is used as a colorant, the water-based ink of the present invention is excellent in not only pigment dispersion stability, but also jetting property when printed with an inkjet printer, and also shows excellent water resistance, excellent high-lighter fastness and excellent rubbing resistance, since the water-insoluble polymer having an ionic group at its end is used together with the pigment.

[Colorant]

As the colorant, a pigment and/or a dye can be used.

The pigment can be any of an inorganic pigment and an organic pigment. The pigment can be used together with an extender as occasion demands.

The inorganic pigment includes, for instance, carbon black, metal oxides, metal sulfides and the like. The carbon black includes furnace black, thermal lamp black, acetylene black, channel black, gas black and the like.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

When the pigment is used in a water-based ink, there is a necessity to use fine particles stable in the ink by using a surfactant, a water-soluble polymer or a polymer insoluble to water as described below. It is preferable that the pigment is contained in the water-insoluble polymer particles from the viewpoints of water resistance, rubbing resistance, high-lighter fastness and blotting resistance.

As the dye, a hydrophobic dye is preferable from the viewpoint of water resistance. Examples of the hydrophobic dye include an oil-soluble dye, a disperse dye, a basic dye and the like. Among them, the oil-soluble dye and the disperse dye are preferable from the viewpoint of color developability.

The oil-soluble dye is not limited to specified ones, and includes, for instance, C.I. Solvent Black 3, 7, 27, 29 and 34; C.I. Solvent Yellow 14, 16, 29, 56 and 82; C.I. Solvent Red 1, 3, 8, 18, 24, 27, 43, 51, 72 and 73; C.I. Solvent Violet 3; C.I. Solvent Blue 2, 11 and 70; C.I. Solvent Green 3 and 7; C.I. Solvent Orange 2; and the like.

The disperse dye is not limited to specified ones, and preferable examples of the disperse dye includes C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1; and the like.

When the hydrophobic dye is used in a water-based ink, it is necessary to form stable fine particles in the ink by using a surfactant, a water-soluble polymer or a polymer insoluble to water described below. Especially, it is preferable that the hydrophobic dye is contained in the water-insoluble polymer particles described below from the viewpoints of water resistance, rubbing resistance, high-lighter fastness and blotting resistance. It is desired that the solubility of the hydrophobic dye in an organic solvent used for the preparation of the water-insoluble polymer is at least 2 g/L, preferably 20 to 500 g/L at 20° C. from the viewpoint of efficiently incorporating the hydrophobic dye into the water-insoluble polymer.

In order to disperse the pigment in the water-based ink as stable fine particles, there can be used a surfactant, a water-soluble polymer or a water-insoluble polymer. In order to obtain a water-based ink excellent in water resistance, high-lighter fastness and rubbing resistance, it is preferable that the pigment is contained in the water-insoluble polymer particles described below.

The surfactant used in the dispersion of the pigment includes anionic surfactants, cationic surfactants, nonionic surfactants and amphoteric surfactants. Among them, a sodium salt of β-naphthalenesulfonate-formaldehyde condensate (for instance, products commercially available from Kao Corporation under the trade names of Demol N, Demol RN, Demol MS and the like), and carboxylate polymer surfactants (for instance, a product commercially available from Kao Corporation under the trade names of Poise 520, Poise 521, Poise 530 and the like) are preferable.

It is desired that the amount of the surfactant is 1 to 120 parts by weight, preferably 3 to 70 parts by weight, more preferably 5 to 30 parts by weight, based on 100 parts by weight of the pigment, from the viewpoints of dispersion stability of the coloring material in the ink and jetting property of the ink.

The water-soluble polymer which may be used in the aqueous dispersion of the pigment includes water-soluble vinyl polymers, water-soluble ester polymers, water-soluble urethane polymers and the like. Among them, the water-soluble vinyl polymers are preferable.

[Water-Insoluble Polymer]

The term "end" of the water-insoluble polymer as referred to herein means an end of the main chain of the water-insoluble polymer, not an end of the side chain of the water-insoluble polymer. However, when the water-insoluble polymer is a grafted copolymer, the term "end" of the water-insoluble polymer can include an end of a grafted chain.

The end of the water-insoluble polymer may be an end derived from a polymerization initiator, an end derived from a chain transfer agent, or an end derived from a monomer.

The term "water-insoluble" used in the water-insoluble polymer as referred to herein means that the amount of the polymer dissolved in 100 g of water at 25° C. is preferably less than 2 g when the salt-forming group of the polymer is neutralized at the time of dissolving the polymer in an organic solvent such as methyl ethyl ketone and preparing an aqueous dispersion of the polymer, and thereafter the aqueous dispersion is dried at 105° C. for 2 hours to give a polymer. The term "water-soluble" means those other than that defined as "water-insoluble."

The solubility of the water-insoluble polymer contained in the aqueous dispersion of the water-insoluble polymer is determined by drying the aqueous dispersion at 105° C. for 2 hours to remove a solvent to give a solid matter contained in the aqueous dispersion, and dissolving the solid matter in 100 g of water at 25° C.

(Water-Insoluble Polymer having at Least Two Hydroxyl Groups at end)

A water-insoluble polymer having at least two hydroxyl groups at its end can be prepared, for instance, by using a chain transfer agent having at least two hydroxyl groups, a polymerization initiator and an iniferter (initiator-transfer agent-terminator) having both functions of the chain transfer agent and the initiator during the polymerization of the polymer. The phrase "having at least two hydroxyl groups at its end" means having at least two hydroxyl groups at one end. When the chain transfer agent having at least two hydroxyl groups is used as described above, there is an advantage such that the jetting property becomes excellent when jetted with an inkjet printer.

Representative examples of the chain transfer agent having at least two hydroxyl groups include:

a mercapto-group containing chain transfer agent represented by the formula (II):

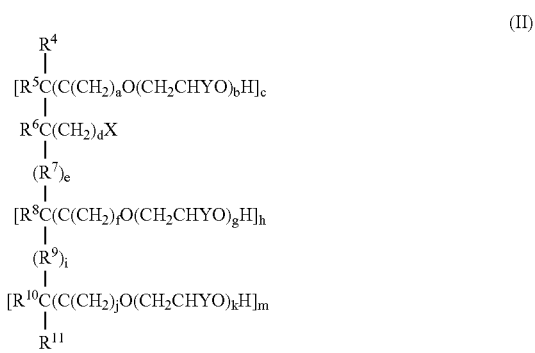

wherein each of $R^4$, $R^5$, $R^6$, $R^8$, $R^{10}$, and $R^{11}$ is independently a hydrogen atom, $-C_nH_{2n+1}$, wherein n is an integer of 1 to 18, or —$C_nH_{2n}O(CH_2CHYO)_qH$, wherein Y is a hydrogen atom or methyl group, q is a number of 0 to 20, and n is as defined above; each of $R^7$ and $R^9$ is independently a hetero atom, —$C_nH_{2n}$—, wherein n is as defined above, or a divalent hydrocarbon group which optionally has a hetero atom; X is mercapto group; each of a, d, f and j is independently a number of 0 to 12; each of b, g and k is independently a number of 0 to 30; each of c, h and m is independently a number of 1 to 5; and each of e and i is independently 0 or 1, with proviso that the total number of hydroxyl groups per molecule is at least 2;

a mercapto-group containing chain transfer agent represented by the formula (III):

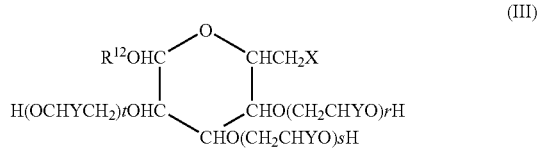

(III)

wherein $R^{12}$ is a hydrogen atom or —$C_nH_{2n+1}$, wherein n is as defined above; Y is as defined above; X is as defined above; each of r, s and t is independently a number of 0 to 30, with proviso that the total number of hydroxyl groups per molecule is at least 2; and the like. Those chain transfer agents can be used alone or in admixture.

The mercapto-group containing chain transfer agent represented by the formula (II) includes, for instance, monomercapto-compounds of glycerol, diglycerol, triglycerol, tetraglycerol, trimethylolethane, trimethylolpropane, trimethylolbutane, 1,2,6-hexanetriol, 2-ethyl-2-(hydroxymethyl)-1,3-propanediol, 2-methyl-2-(hydroxymethyl)-1,3-propanediol, pentaerythritol, erythritol, D-, L- and DL-threitol, adonitol, D- and L-arabitol, xylitol, dulcitol, L-iditol, D-mannitol and D-sorbitol. Among them, 3-mercapto-1,2-propanediol which is a monomercapto-compound of glycerol, 6-mercaptodiglycerol which is a monomercapto-compound of diglycerol, and a monomercapto-compound of pentaerythritol are preferable, and 3-mercapto-1,2-propanediol is more preferable, from the viewpoint of obtaining a water-based ink being excellent in jetting property.

The mercapto-group containing chain transfer agent represented by the formula (III) includes, for instance, a monomercapto-compound of glucose, a monomercapto-compound of α-methylglucoside, a monomercapto-compound of β-methyl-D-alloside, and the like. Among them, the monomercapto-compound of glucose is preferable, and 1-thio-β-D-glucose is more preferable, from the viewpoint of obtaining a water-based ink being excellent in jetting property.

It is preferable that the amount of the chain transfer agent having at least two hydroxyl groups is 0.001 to 10 parts by weight based on 100 parts by weight of the entire monomers provided in the polymerization, from the viewpoint of obtaining a water-based ink being excellent in jetting property and from the viewpoint of dispersion stability. In addition, the amount of the chain transfer agent having at least two hydroxyl groups is preferably 0.01 to 7 parts by weight, more preferably 0.1 to 5 parts by weight based on 100 parts by weight of the entire monomers provided in the polymerization from the viewpoint of the balance between water resistance, rubbing resistance, jetting property and blotting resistance.

An initiator or iniferter having at least two hydroxyl groups can be also used in the same amount as the chain transfer agent.

(Water-Insoluble Polymer having Ionic Group at end)

The term "ionic group" as referred to herein means both a functional group already having an electric charge and being in an ionic state, and a functional group not having an electric charge but being capable of forming an ion by external action.

The ionic group includes cationic groups, anionic groups and betaine groups. It is preferable that the ionic group exists on one end or both ends of the polymer. The number of the ionic groups per one end is preferably at least one, more preferably at least two, from the viewpoint of hydrophilicity.

Concrete examples of the cationic group include an amine base represented by the formula: —$NH_nR^4_{2-n}$, wherein n is an integer of 0 to 2, each $R^4$ is independently an alkyl group or aryl group; pyridinium salt; imidazolium salt; a phosphine group represented by the formula: —$P(R^5)_2$, wherein each $R^5$ is independently an alkyl group or aryl group; and the like. Each of these cationic groups can be used alone or in admixture of at least two kinds. Among them, the amine base is preferable from the viewpoints of dispersion stability of an ink and satisfaction of water resistance and rubbing resistance. The above-mentioned alkyl group is preferably an alkyl group having 1 to 8 carbon atoms, and the above-mentioned aryl group is preferably an aryl group having 6 to 12 carbon atoms.

Concrete examples of the anionic group include —COOM group, wherein M is a hydrogen atom or an alkyl metal atom, hereinafter referred to the same, —$SO_3M$ group, —$PO_3M_2$ group and the like. Each of those anionic groups can be used alone or in admixture of at least two kinds.

Concrete examples of the betaine-based group include carbobetaine group, sulfobetaine group, phosphobetaine group, for instance, those compounds having amino group and carboxyl group in its molecule, such as amino acids. Those betaine-based groups can be used alone or in admixture of at least two kinds. Among them, the compound having amino group and carboxyl group in its molecule is preferable from the viewpoints of dispersion stability of an ink and satisfaction of water resistance and rubbing resistance.

It is preferable that the ionic group is an ionic group derived from at least one member selected from the group consisting of a chain transfer agent having an ionic group, a polymerization initiator having an ionic group and an iniferter having an ionic group which has the functions of the chain transfer agent and the polymerization initiator (hereinafter simply referred to as "iniferter").

The water-insoluble polymer having an ionic group at its end can be obtained by polymerizing monomers in the presence of at least one member selected from the group consisting of the chain transfer agent having an ionic group, the polymerization initiator having an ionic group and the iniferter.

The polymerization initiator having an ionic group includes 2,2'-azobis(2-amidinopropane), dibasic acids, 4,4'-azobis(4-cyanovaleric acid), 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(2-imidazolin-2-yl)propane]disulfate dihydrate, 2,2'-azobis[2-(3,4,5,6-tetrahydropyrimidin-2-yl)propane]dihydrochloride, 2,2'-azobis[2-(1-(2-hydroxyethyl)-2-yl)propane]dihydrochloride, and the like.

The chain transfer agent having an ionic group may be those having a functional group for causing chain transfer and an ionic group. The functional group for causing chain transfer includes, for instance, mercapto group, disulfide group and the like. Among them, mercapto group is preferable. There is no limitation in the number of ionic groups in the chain transfer agent having an ionic group, and the number of ionic groups can be at least 2.

Concrete examples of the chain transfer agent having an ionic group includes chain transfer agents having cationic group, such as 1-amino-2-methyl-2-propanethiol, 2-aminoethanethiol, 2-diethylaminoethanethiol, 2-dimethylaminoethanethiol, 4-aminothiophenol, dithiodianiline, 3,4,5,6-tetrahydro-2-pyrimidinethiol and 2-mercaptothiazoline; chain transfer agents having anionic group, such as thioglycollic acid, mercaptopropionic acid, mercaptosuccinic acid, thiolactic acid, 4,4'-dithiobutyric acid, 3,3'-dithiopropionic acid and dithioglycollic acid; and chain transfer agents having a betaine group, such as thiol group-containing amino acids such as DL-penicillamine, N-(2-mercaptopropionyl)glycine, DL-cysteine, DL-homocysteine, cystamine, DL-cystine and their derivatives. Those chain transfer agents can be used alone or in admixture of at least two kinds.

From the viewpoint of obtaining a water-based ink being excellent in jetting property, 2-aminoethanethiol and 2-diethylaminoethanethiol are preferable among the chain transfer agents having a cationic group; thioglycollic acid, mercaptosuccinic acid and mercaptopropionic acid are preferable among the chain transfer agents having an anionic group; and DL-cysteine is preferable among the chain transfer agents having a betaine group. Among them, thioglycollic acid, mercaptopropionic acid and mercaptosuccinic acid are more preferable, and mercaptosuccinic acid which is a chain transfer agent having two ionic groups at one end is still more preferable.

When the chain transfer agent not having an electric charge but being capable of forming an ion by external action is used, all or a part of the functional groups are ionized before the preparation of the water-based ink. The ionization of the functional group can be carried out by adding an ionizing compound to this chain transfer agent, thereby ionizing the functional group of the chain transfer agent, or ionizing the functional group in its molecule by the functional group of the water-insoluble polymer.

For instance, when the monomers are polymerized in the presence of thioglycollic acid as a chain transfer agent, an alkaline compound capable of neutralizing an active hydrogen of thioglycollic acid may be added to the resulting polymerization reaction mixture. The alkaline compound includes sodium hydroxide, potassium hydroxide, aqueous ammonia and the like. However, even in this case, when the monomer having amino group is contained in the monomers constituting the polymer, since end carboxyl group of the produced polymer has been already ionized, addition of the alkaline compound would not be necessitated at the termination of the polymerization.

When the chain transfer agent having a cationic group is used as a chain transfer agent, there can be used a compound having an opposite electric charge, namely a compound having an anionic group.

It is preferable that the amount of the chain transfer agent having an ionic group is 0.001 to 10 parts by weight based on 100 parts by weight of the entire monomers provided in the polymerization from the viewpoint of obtaining a water-based ink being excellent in jetting property and from the viewpoint of improving dispersion stability of the water-insoluble polymer. Also, the amount of the chain transfer agent having an ionic group is preferably 0.01 to 7 parts by weight, more preferably 0.1 to 5 parts by weight, based on 100 parts by weight of the entire monomers provided in the polymerization from the viewpoints of obtaining a water-based ink being excellent in water resistance, rubbing resistance, jetting property and blotting resistance.

The iniferter includes 1,2-biscarboxymethyl-1,1,2,2-tetraphenylethane, 1,2-bis(2-carboxyethyl)-1,1,2,2-tetraphenylethane and the like.

Among the chain transfer agent having an ionic group, the polymerization initiator having an ionic group and the iniferter, the chain transfer agent having an ionic group is preferable because the compound can be conveniently used.

An initiator or iniferter having an ionic group can be also used in the same amount as the chain transfer agent.

(Process for Preparing Water-Insoluble Polymer)

Kinds of the monomers constituting the polymer in the present invention are not limited to specified ones. It is preferable that the water-insoluble polymer is a water-insoluble vinyl polymer in order to maximally exhibit excellent jetting property, water resistance, high-lighter fastness and rubbing resistance.

It is more preferable that the water-insoluble polymer having at least two hydroxyl groups at its end is a water-insoluble vinyl polymer obtained by copolymerizing a monomer mixture comprising (A) a salt-forming group-containing monomer [hereinafter referred to as component (A)], (B) a macromer [hereinafter referred to as component (B)], (C) a monomer copolymerizable with the salt-forming group-containing monomer and the macromer [hereinafter referred to as component (C)], in the presence of at least one member selected from the group consisting of a chain transfer agent having at least two hydroxyl groups, a polymerization initiator having at least two hydroxyl groups and an iniferter having at least two hydroxyl groups, which has both functions of the chain transfer agent and the initiator.

It is more preferable that the water-insoluble polymer having an ionic group at its end is a water-insoluble vinyl polymer obtained by copolymerizing a monomer mixture comprising the component (A), the component (B) and the component (C), in the presence of at least one member selected from the group consisting of a chain transfer agent having an ionic group, a polymerization initiator having an ionic group and an iniferter having an ionic group, which has both functions of the chain transfer agent and the initiator.

The component (A) includes a cationic monomer, an anionic monomer and the like. Examples of the component (A) include the cationic monomers and the anionic monomers described at page 5, column 7, line 24 to column 8, line 29 of Japanese Patent Laid-Open No. Hei 9-286939.

Representative examples of the cationic monomer include unsaturated monomers having an amino group, unsaturated monomers having an ammonium salt group, and the like. Among them, N,N-dimethylaminoethyl (meth)acrylate, N-(N',N'-dimethylaminopropyl) (meth)acrylamide and vinylpyrrolidone are preferable.

Representative examples of the anionic monomer include unsaturated carboxylic acid monomers, unsaturated sulfonic acid monomers, unsaturated phosphoric acid monomers, and the like. Among them, the unsaturated carboxylic acid monomers such as acrylic acid and methacrylic acid are preferable.

The content of the component (A) in the water-insoluble vinyl polymer is preferably 1 to 50% by weight, more preferably 2 to 40% by weight from the viewpoint of dispersion stability of the dispersion.

The component (B) includes a macromer having a polymerizable unsaturated group and a number-average molecular weight of preferably 500 to 500000, more preferably 1000 to 10000. Among them, a styrenic macromer having a polymerizable functional group at one end is preferable because of its high affinity for the colorant.

The number-average molecular weight of the component (B) is determined by gel permeation chromatography using polystyrene as a standard substance and chloroform containing 1 mmol/L dodecylmethylamine as a solvent.

The content of the component (B) in the water-insoluble vinyl polymer is preferably 1 to 25% by weight, more preferably 5 to 20% by weight from the viewpoint of giving pigment-containing polymer particles improved dispersion stability.

The styrenic macromer includes a styrene homopolymer having a polymerizable functional group at one end, a copolymer of styrene and other monomer, having a polymerizable functional group at one end, and the like. Among them, those having acryloyl group or methacryloyl group at one end as a polymerizable functional group are preferable. The content of styrene in the macromer is preferably at least 50% by weight, more preferably at least 70% by weight from the viewpoint of improving affinity for a pigment. The other monomer includes acrylonitrile and the like.

The component (C) includes, for instance, (meth)acrylates having an ester moiety of 1 to 30 carbon atoms, such as methyl(meth)acrylate, ethyl(meth)acrylate, (iso)propyl (meth)acrylate, (iso or tertiary)butyl(meth)acrylate, (iso) amyl(meth)acrylate, cyclohexyl(meth)acrylate, benzyl (meth)acrylate, 2-ethylhexyl(meth)acrylate, (iso)octyl (meth)acrylate, (iso)decyl(meth)acrylate, (iso)dodecyl (meth)acrylate and (iso)stearyl(meth)acrylate; styrenic monomers such as styrene, vinyltoluene, 2-methylstyrene and chlorostyrene; and the like. Those monomers can be used alone or in admixture of at least two kinds.

Incidentally, the terms "(iso- or tertiary-)" and "(iso)" as referred to herein include both cases where these groups are present and where they are absent. In the case where these groups are absent, each of the listed compounds has a normal form. Also, "(meth)acrylate" means acrylate or methacrylate.

It is preferable that the component (C) contains a styrenic monomer from the viewpoint of giving a water-based ink improved optical density and high-lighter fastness. As the styrenic monomer, styrene and 2-methylstyrene are preferable. Those styrenic monomers can be used alone or in admixture of at least two kinds. In this case, the content of the styrenic monomer in the component (C) is preferably 10 to 100% by weight, more preferably 40 to 100% by weight, especially preferably 10 to 60% by weight from the viewpoint of giving a water-based ink improved optical density and high-lighter fastness.

The content of the component (C) in the water-insoluble vinyl polymer is preferably 5 to 88% by weight, more preferably 10 to 60% by weight from the viewpoint of giving a water-based ink improved water resistance, rubbing resistance and high-lighter fastness.

The monomer mixture may further contain at least one monomer selected from the group consisting of (D) a hydroxyl group-containing monomer [hereinafter referred to as component (D)], and (E) a monomer represented by the formula (I):

(I)

wherein $R^1$ is a hydrogen atom or a lower alkyl group having 1 to 5 carbon atoms; $R^2$ is a divalent hydrocarbon group having 1 to 30 carbon atoms which optionally has a hetero atom; $R^3$ is a hydrogen atom or a monovalent hydrocarbon group having 1 to 30 carbon atoms which optionally has a hetero atom; and p is a number of 1 to 60 [hereinafter referred to as component (E)].

The component (D) exhibits some excellent effects such as the increase of dispersion stability and the improvement of high-lighter fastness in a short period of time during printing.

The component (D) includes, for instance, 2-hydroxyethyl(meth)acrylate, 3-hydroxypropyl(meth)acrylate, polyethylene glycol(n=2 to 30, wherein n is the number of moles of ethylene oxide added, hereinafter referred to the same) (meth)acrylate, poly(ethylene glycol(n=1 to 15)-propylene glycol(n=1 to 15)) (meth)acrylate, and the like. Among them, 2-hydroxyethyl(meth)acrylate is preferable.

The content of the component (D) in the water-insoluble vinyl polymer is preferably 5 to 40% by weight, more preferably 7 to 20% by weight from the viewpoints of giving a water-based ink improved jetting stability, optical density and high-lighter fastness.

The total content of the component (A) and the component (D) in the water-insoluble vinyl polymer is preferably 6 to 60% by weight, more preferably 10 to 50% by weight, from the viewpoints of giving a water-insoluble polymer improved stability in water and giving a water-based ink improved water resistance.

The component (E) exhibits excellent effects such as giving a water-based ink of the present invention increased jetting stability, and suppressing the generation of crookedness even when continuous printing is carried out.

In the formula (I), $R^1$ is a hydrogen atom or a lower alkyl group having 1 to 5 carbon atoms. Among them, hydrogen atom and methyl group are preferable.

$R^2$ is a divalent hydrocarbon group having 1 to 30 carbon atoms which optionally has a hetero atom. The hetero atom includes, for instance, nitrogen atom, oxygen atom, a halogen atom and sulfur atom.

Representative examples of $R^2$ include an aromatic ring having 6 to 30 carbon atoms which optionally has a substituent; a heterocyclic ring having 3 to 30 carbon atoms which optionally has a substituent; and an alkylene group having 1 to 30 carbon atoms which optionally has a substituent. These rings or groups can be used in admixture of at least two kinds. The substituent includes an aromatic ring having 6 to 29 carbon atoms, a heterocyclic ring having 3 to 29 carbon atoms, an alkyl group having 1 to 29 carbon atoms, halogen atoms, amino group, and the like.

Preferred examples of $R^2$ include a phenylene group which optionally has a substituent of 1 to 24 carbon atoms; an aliphatic alkylene group having 1 to 30 carbon atoms, preferably 1 to 20 carbon atoms; an aromatic ring-containing alkylene group having 7 to 30 carbon atoms; and a heterocyclic ring-containing alkylene group having 4 to 30 carbon atoms.

Preferred examples of the $R^2O$ group include an oxyalkylene group having 2 to 7 carbon atoms, such as oxyethylene group, oxy(iso)propylene group, oxytetramethylene group, oxyheptamethylene group, oxyhexamethylene group and a combination of at least two members of these oxyalkylenes; and oxyphenylene group.

$R^3$ is a hydrogen atom or a monovalent hydrocarbon group having 1 to 30 carbon atoms which optionally has a hetero atom. The hetero atom includes, for instance, nitrogen atom, oxygen atom and sulfur atom.

Representative examples of $R^3$ include an aromatic ring having 6 to 30 carbon atoms which optionally has a substituent; a heterocyclic ring having 3 to 30 carbon atoms which optionally has a substituent; or an alkyl group having 1 to 30 carbon atoms which optionally has a substituent. The substituent includes an aromatic ring having 6 to 29 carbon atoms, a heterocyclic ring having 4 to 29 carbon atoms, halogen atoms, amino group, and the like.

Preferred examples of $R^3$ include phenyl group, an aliphatic alkyl group having 1 to 30 carbon atoms, preferably 1 to 20 carbon atoms, an aromatic ring-containing alkyl group having 7 to 30 carbon atoms, and a heterocyclic ring-containing alkyl group having 4 to 30 carbon atoms.

More preferable examples of $R^3$ include alkyl groups having 1 to 6 carbon atoms, such as methyl group, ethyl group, (iso)propyl group, (iso)butyl group, (iso)pentyl group and (iso)hexyl group; phenyl group; and the like.

p is a number of 1 to 60. p is preferably a number of 1 to 30.

Concrete examples of the component (E) include methoxypolyethylene glycol (1-30: showing the value of p in the formula (I), hereinafter referred to the same) (meth)acrylates, methoxypolytetramethylene glycol (1-30) (meth)acrylates, ethoxypolyethylene glycol (1-30) (meth)acrylates, (iso)propoxypolyethylene glycol (1-30) (meth)acrylates, butoxypolyethylene glycol (1-30) (meth)acrylates, methoxypolypropylene glycol (1-30) (meth)acrylates, methoxy (ethylene glycol-propylene glycol copolymer) (1-30, out of which ethylene glycol: 1-29) (meth)acrylates, and the like. Those monomers can be used alone or in admixture of at least two kinds. Among them, the methoxypolyethylene glycol (1-30) (meth)acrylates are preferable.

It is desired that the content of the component (E) in the water-insoluble vinyl polymer is 5 to 50% by weight, preferably 10 to 40% by weight, from the viewpoints of giving a water-based ink improved jetting stability and giving a water-insoluble polymer improved dispersion stability.

The total content of the component (A) and the component (E) in the water-insoluble vinyl polymer is preferably 6 to 75% by weight, more preferably 13 to 50% by weight, from the viewpoints of giving a water-insoluble polymer improved dispersion stability and giving a water-based ink improved jetting stability.

The total content of the component (A), the component (D) and the component (E) in the water-insoluble vinyl polymer is preferably 6 to 60% by weight, more preferably 11 to 60% by weight, especially preferably 19 to 50% by weight from the viewpoints of giving a water-insoluble polymer improved dispersion stability and giving a water-based ink improved jetting stability.

The water-insoluble vinyl polymer can be prepared by copolymerizing a monomer mixture by a known polymerization method such as a bulk polymerization method, a solution polymerization method, a suspension polymerization method or an emulsion polymerization method. Among those polymerization methods, the solution polymerization method is preferable.

The solvent used in the solution polymerization method is not limited to specified ones, and a polar organic solvent is preferable. The polar organic solvent can be used in admixture with water.

The polar organic solvent includes, for instance, aliphatic alcohols having 1 to 3 carbon atoms, such as methanol, ethanol and propanol; ketones such as acetone, methyl ethyl ketone and methyl isobutyl ketone; esters such as ethyl acetate; and the like. Among them, ethanol, acetone, methyl ethyl ketone, methyl isobutyl ketone or a mixture of the solvent and water is preferable.

A radical polymerization initiator can be used in the polymerization. Preferable radical polymerization initiators are azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis(1-cyclohexanecarbonitrile). Also, there can be used organic peroxides such as t-butyl peroxyoctoate, di-t-butyl peroxide and dibenzoyl oxide.

The amount of the radical polymerization initiator is preferably 0.001 to 5% by weight, more preferably 0.01 to 2% by weight in the monomer mixture.

The chain transfer agent, the polymerization initiator and the iniferter, which have an ionic group or at least two hydroxyl groups can be used in proper amounts at the initiation of the polymerization or during the polymerization.

The conditions for polymerizing the monomer mixture cannot be absolutely determined because the conditions differ depending upon kinds of the radical polymerization initiator, the monomers and the solvent used, and the like. Usually, the polymerization temperature is preferably 30° to 100° C., more preferably 50° to 80° C., and the polymerization time is preferably 1 to 20 hours. It is preferable that the atmosphere for polymerization is an inert gas such as nitrogen gas.

After the termination of the polymerization reaction, the water-insoluble vinyl polymer can be isolated from the reaction solution by a known method such as re-precipitation or solvent distillation. Also, unreacted monomers and the like can be removed from the resulting water-insoluble vinyl polymer to purify by the repeat of re-precipitation, membrane separation, a chromatographic method, an extraction method or the like.

It is preferable that the weight-average molecular weight of the polymer is 3000 to 100000, as determined in accordance with the method described in Examples given below, from the viewpoints of water resistance, rubbing resistance, high-lighter fastness and dispersion stability.

As the neutralizing agent for the water-insoluble vinyl polymer, an acid or a base can be used in accordance with the kind of the salt-forming group of the polymer. The acid includes, for instance, inorganic acids such as hydrochloric acid and sulfuric acid; and organic acids such as acetic acid, propionic acid, lactic acid, succinic acid, glycollic acid, gluconic acid and glyceric acid. The base includes, for instance, amines such as trimethylamine, triethylamine, diethanolamine, N-methyldiethanolamine and triethanolamine; ammonia; alkali metal hydroxides such as sodium hydroxide and potassium hydroxide; and the like.

The neutralization degree of the water-insoluble vinyl polymer is not limited to specified ones. It is preferable that the resulting aqueous dispersion is usually neutral, for instance the pH of the aqueous dispersion is 4.5 to 9.5.

[Water-Based Ink]

After the neutralization of the water-insoluble vinyl polymer, the water-insoluble vinyl polymer can be solely contained in the ink. Alternatively, polymer particles of the water-insoluble vinyl polymer containing a colorant can be contained in the ink. Among them, the polymer particles of the water-insoluble vinyl polymer containing a colorant are preferable from the viewpoint of satisfying all of water resistance, high-lighter fastness, rubbing resistance, jetting property and blotting resistance. Therefore, it is preferable that a colorant is contained in the water-insoluble polymer particles having an ionic group at its end or having at least two hydroxyl groups at its end.

The content of the water-insoluble polymer in the water-based ink is preferably 0.05 to 20 parts by weight, more preferably 0.1 to 10 parts by weight, still more preferably 0.5 to 5 parts by weight based on 100 parts by weight of the water-based ink from the viewpoints of water resistance, rubbing resistance, high-lighter fastness, jetting property and bleeding resistance.

A preferable process for preparing a water-based ink comprising an aqueous dispersion of pigment-containing water-insoluble polymer particles having an ionic group at its end or at least two hydroxyl groups at its end includes a process comprising dissolving the water-insoluble polymer having an ionic group at its end or at least two hydroxyl groups at its end in an organic solvent; adding a pigment, water and a neutralizing agent, and a surfactant as occasion demands to the resulting solution; kneading the mixture to form a paste; diluting the paste with water as occasion demands; and distilling off the organic solvent to make it into a water-based system.

In addition, a water-based ink comprising an aqueous dispersion of hydrophobic dye-containing water-insoluble polymer particles having at least two hydroxyl groups at its end can be prepared by a known emulsification process. For instance, the water-based ink can be obtained by dissolving water-insoluble polymer having at least two hydroxyl groups at its end and a hydrophobic dye in an organic solvent; adding a neutralizing agent to the resulting solution as occasion demands to ionize the salt-forming group of the polymer; adding water thereto; dispersing the mixture using a disperser or a ultrasonic emulsifier as occasion demands; and thereafter distilling off the organic solvent to make it into a water-based system.

The amount of the colorant in the water-insoluble polymer particles having an ionic group at its end or at least two hydroxyl groups at its end is preferably 20 to 1000 parts by weight, more preferably 40 to 800 parts by weight, still more preferably 60 to 600 parts by weight based on the solid content of the water-insoluble polymer from the viewpoints of increasing optical density, facilitating the incorporation of the colorant into the polymer particles and improving water resistance, rubbing resistance and high-lighter fastness.

The average particle diameter of the water-insoluble polymer particles having an ionic group at its end or at least two hydroxyl groups at its end is determined in accordance with the method described in the following Preparation Examples. It is preferable that the average particle diameter is 10 to 500 nm from the viewpoint of dispersion stability.

The content of the colorant in the water-based ink is not limited to specified ones as long as satisfactory optical density can be obtained. Usually, the content of the colorant in the water-based ink is preferably 1 to 30% by weight, more preferably 2 to 10% by weight, more preferably 4 to 8% by weight from the viewpoint of giving a water-based ink composition satisfactory jetting stability and optical density.

There can be added various known additives, for instance, a wetting agent such as polyhydric alcohols, a dispersant, a defoaming agent, a mildewproof agent, a chelating agent, a pH adjusting agent and the like as occasion demands to the water-based ink of the present invention.

EXAMPLES

Preparation Examples 1 to 4 (Preparation of Polymer Solutions)

A reaction vessel was charged with monomers, a solvent and a chain transfer agent having an ionic group in the kinds and amounts listed in the column of "initially charged monomers" of Table 1, and nitrogen gas substitution was sufficiently carried out. Thereafter, the temperature was raised to 75° C.

On the other hand, a dropping funnel was charged with monomers, a solvent, a chain transfer agent and 2,2'-azobis (2,4-dimethylvaleronitrile) listed in the column of "dropping monomers" of Table 1, and the mixture in the reaction vessel was polymerized while adding dropwise the mixture in the dropping funnel to the reaction vessel over a period of 5 hours. Thereafter, the resulting mixture was aged for 2 hours, and methyl isobutyl ketone was then added to the mixture in a proper amount, to give a polymer solution, the solid content of which was 50% by weight.

The polymers obtained in Preparation Examples 1 to 3 have an ionic group derived from the chain transfer agent at their ends, and the polymer obtained in Preparation Example 4 does not have an ionic group.

A part of the resulting polymer solution was dried under reduced pressure at 105° C. for 2 hours and isolated by removing the solvent therefrom. The weight-average molecular weight of the polymer was determined by gel permeation chromatography using polystyrene as a standard substance, and chloroform containing dodecyldimethylamine of 1 mmol/L as a solvent. As a result, the polymer had a weight-average molecular weight as shown in Table 1. The fact that the resulting polymer has an ionic group at its end can be confirmed by the measurement of NMR or the like.

Each name listed in Table 1 means the followings:

Styrenic macromer: commercially available from TOA-GOSEI CO., LTD. under the trade name of AS-6 (styrene homopolymerized macromer having a polymerizable functional group of methacryloyloxy group at one end, number-average molecular weight: 6000)

Monomethoxypolyethylene glycol(n=4) methacrylate: commercially available from Shin-Nakamura Chemical Co., Ltd. under the trade name of NK ESTER M-40G

TABLE 1

| Prep. Ex. No. | Initially Charged Monomers | Dropping Monomers | Weight-Average Molecular Weight |
|---|---|---|---|
| 1 | Methyl Ethyl Ketone [30] Methacrylic Acid [3] Styrene [12] Styrenic Macromer [3] Monomethoxypolyethylene Glycol(n = 4) Methacrylate [3] Hydroxyethyl Methacrylate [3] Thioglycollic Acid [0.15] | Methyl Ethyl Ketone [70] Methacrylic Acid [7] Styrene [28] Styrenic Macromer [7] Monomethoxypolyethylene Glycol(n = 4) Methacrylate [7] Hydroxyethyl Methacrylate [7] Thioglycollic Acid [0.35] | 19000 |

TABLE 1-continued

| Prep. Ex. No. | Initially Charged Monomers | Dropping Monomers | Weight-Average Molecular Weight |
|---|---|---|---|
| 2 | Methyl Ethyl Ketone [30]<br>Methacrylic Acid [3]<br>Styrene [12]<br>Styrenic Macromer [3]<br>Monomethoxypolyethylene Glycol(n = 4) Methacrylate [3]<br>Hydroxyethyl Methacrylate [3]<br>Mercaptopropionic Acid [0.15] | 2,2'-Azobis(2,4-dimethylvaleronitrile [1]<br>Methyl Ethyl Ketone [70]<br>Methacrylic Acid [7]<br>Styrene [28]<br>Styrenic Macromer [7]<br>Monomethoxypolyethylene Glycol(n = 4) Methacrylate [7]<br>Hydroxyethyl Methacrylate [7]<br>Mercaptopropionic Acid [0.35]<br>2,2'-Azobis(2,4-dimethylvaleronitrile [1] | 16000 |
| 3 | Methyl Ethyl Ketone [30]<br>Methacrylic Acid [3]<br>Styrene [12]<br>Styrenic Macromer [3]<br>Monomethoxypolyethylene Glycol(n = 4) Methacrylate [3]<br>Hydroxyethyl Methacrylate [3]<br>Mercaptosuccinic Acid [0.15] | Methyl Ethyl Ketone [70]<br>Methacrylic Acid [7]<br>Styrene [28]<br>Styrenic Macromer [7]<br>Monomethoxypolyethylene Glycol(n = 4) Methacrylate [7]<br>Hydroxyethyl Methacrylate [7]<br>Mercaptosuccinic Acid [0.35]<br>2,2'-Azobis(2,4-dimethylvaleronitrile [1] | 22200 |
| 4 | Methyl Ethyl Ketone [30]<br>Methacrylic Acid [3]<br>Styrene [12]<br>Styrenic Macromer [3]<br>Monomethoxypolyethylene Glycol(n = 4) Methacrylate [3]<br>Hydroxyethyl Methacrylate [3]<br>Mercaptoethanol [0.15] | Methyl Ethyl Ketone [70]<br>Methacrylic Acid [7]<br>Styrene [28]<br>Styrenic Macromer [7]<br>Monomethoxypolyethylene Glycol(n = 4) Methacrylate [7]<br>Hydroxyethyl Methacrylate [7]<br>Mercaptoethanol [0.35]<br>2,2'-Azobis(2,4-dimethylvaleronitrile [1] | 21000 |

Preparation Examples 5 to 12 (Preparation of Aqueous Dispersions of Pigment-Containing Water-Insoluble Polymer Particles)

A pigment, methyl ethyl ketone, ion-exchanged water and a neutralizing agent listed in Table 2 were added to 28 parts by weight of the polymer solution obtained in Preparation Examples 1 to 4 (solid content of the polymer: 50% by weight), and the resulting mixture was sufficiently stirred. Thereafter, the mixture was kneaded twenty times using a triple-roll mill commercially available from NORITAKE CO., LIMITED under the trade name of NR-84A.

The resulting paste was added to 250 parts by weight of ion-exchanged water, and the mixture was sufficiently stirred. Thereafter, methyl ethyl ketone and water were distilled off using an evaporator, to give an aqueous dispersion of pigment-containing water-insoluble polymer particles, the solid content of which was 20% by weight. The average particle diameter of the resulting pigment-containing water-insoluble polymer particles was obtained by the following method. The results are shown in Table 2.

The average particle diameter was determined by cumulant analysis using a particle size distribution analyzer commercially available from Otsuka Denshi K.K. under the trade name of ELS-8000. As the determination conditions, the temperature of 25° C., the angle between the incident beam and a detector of 90°, the total integrated count of 100 counts, a refractive index (1.333) of water as a refractive index of a dispersing solvent were inputted to the particle size distribution analyzer. As a standard substance, one commercially available from Seradyn under the trade name of Uniform Microparticles (particle diameter: 204 nm) was used.

Each name listed in Table 2 means the followings:
Carbon black (commercially available from Degussa under the trade name of Color Black FW18)
Cyan pigment (commercially available from DAINIPPON INK & CHEMICALS, INC. under the trade name of Fastogen Blue TGR-SD)

TABLE 2

| Prep. Ex. No. | Polymer Solution | Pigment | Methyl Ethyl Ketone | Ion-Exchanged Water | Neutralizing Agent 5 N-Aqueous NaOH | Average Particle Diameter (nm) |
|---|---|---|---|---|---|---|
| 5 | Prep. Ex. 1 | Cyan Pigment | 30 | 5 | 2.2 | 128 |
| 6 | Prep. Ex. 1 | Carbon Black | 30 | 5 | 2.2 | 120 |

TABLE 2-continued

|  |  |  | Amount of Each Component (Parts by Weight) | | | Average |
|---|---|---|---|---|---|---|
| Prep. Ex. No. | Polymer Solution | Pigment | Methyl Ethyl Ketone | Ion-Exchanged Water | Neutralizing Agent 5 N-Aqueous NaOH | Particle Diameter (nm) |
| 7 | Prep. Ex. 2 | Cyan Pigment | 30 | 5 | 2.2 | 129 |
| 8 | Prep. Ex. 2 | Carbon Black | 30 | 5 | 2.2 | 130 |
| 9 | Prep. Ex. 3 | Cyan Pigment | 30 | 5 | 2.2 | 131 |
| 10 | Prep. Ex. 3 | Carbon Black | 30 | 5 | 2.2 | 128 |
| 11 | Prep. Ex. 4 | Cyan Pigment | 30 | 5 | 2.2 | 128 |
| 12 | Prep. Ex. 4 | Carbon Black | 30 | 5 | 2.2 | 130 |

(Note)
1) Preparation Example No. listed in the column of "Polymer Solution" means that the polymer obtained in the specified Preparation Example was used.
2) "Average Particle Diameter" means an average particle diameter of the pigment-containing polymer particles.

Examples 1 to 6

There were mixed together 20 parts by weight of each of the aqueous dispersions obtained in Preparation Examples 5 to 10, 8 parts by weight of glycerol, 5 parts by weight of polyethylene glycol (molecular weight: 800), 0.2 parts by weight of acetylene glycol-polyethylene oxide adduct commercially available from Kawaken Fine Chemicals Co., Ltd. under the trade name of Acetylenol EH and 66.8 parts by weight of ion-exchanged water. The resulting liquid mixture was filtered with a membrane filter (commercially available from Fuji Photo Film Co., Ltd., under the trade name of "Disc Capsule CALC120 2.5CMD 50") having a pore diameter of 1.2 μm, to give water-based inks of Examples 1 to 6. Each of these water-based inks contains a water-insoluble polymer having an ionic group at its end.

Comparative Examples 1 and 2

The same procedures as in Example 1 were carried out except that the aqueous dispersion of pigment-containing water-insoluble polymer particles was changed to the aqueous dispersion of pigment-containing water-insoluble polymer particles obtained in Preparation Example 11 or 12, to give water-based inks of Comparative Examples 1 and 2. Each of these water-based inks does not contain a water-insoluble polymer having an ionic group at its end.

Next, the physical properties of the water-based inks obtained in each of Examples and Comparative Examples were evaluated in accordance with the methods described below. The results are shown in Table 3.

(1) Jetting Property of Water-Based Ink and Blotting Resistance

Continuous printing was carried out on 10 sheets of Canon PB paper at 2000 characters per sheet by using a bubble jet printer (registered trademark) commercially available from CANON INC. under the product number of "F870". Thereafter, a test document including characters, solid images and ruled lines was printed on the paper, and the jetting property and blotting resistance were evaluated on the basis of the following evaluation criteria:

[Evaluation Criteria]
⊚: Satisfactory in all of three items of sharp and clear characters, uniform solid images and no crookedness of printed ruled lines (no problem in actual use)
○: Almost satisfactory in three items of sharp and clear characters, uniform solid images and no crookedness of printed ruled lines (no problem in actual use)
x: Unsatisfactory in at least one of three items of sharp and clear characters, uniform solid images and no crookedness of printed ruled lines (problem in actual use)

(2) Water Resistance

Solid image printing was carried out by using the printer and the paper mentioned above, and the paper was allowed to stand in the air at 25° C. for 1 hour. Thereafter, the printed copy paper was immersed vertically in stand-still water for 10 seconds, and the paper was vertically lifted therefrom. After drying the paper in the air at 25° C., the optical density was determined. The residual ratio of the optical density after immersion to the optical density immediately after solid image printing was obtained. The water resistance was evaluated on the basis of the following evaluation criteria:

[Evaluation Criteria]
⊚: Residual ratio being at least 95%
○: Residual ratio being at least 90% and less than 95%
Δ: Residual ratio being at least 70% and less than 90%
x: Residual ratio being less than 70%.

(3) High Lighter-Fastness

Text printing was carried out by using the printer and the paper used mentioned above, and after the plain paper was allowed to stand for 6 hours at 25° C., the extent of staining of the printed sample when traced with a commercially available aqueous fluorescent marker (commercially available from PILOT CORPORATION, under the trade name of "Spotliter V" OASGV-15L) was observed with naked eyes, and the evaluation was made on the basis of the following evaluation criteria:

[Evaluation Criteria]
⊚: No staining such as rubbed stains was observed even when traced with a fluorescent marker.
○: Some rubbed stains which would cause no problems in practical uses were generated when traced with a fluorescent marker.
x: Generation of rubbed stains were observed when traced with a fluorescent marker, which was intolerable.

(4) Rubbing Resistance

Solid image printing was carried out on a gloss paper commercially available from SEIKO EPSON CORPORATION under the trade name of MC gloss paper. After 6 hours passed, the printed surface was strongly rubbed with a finger. The extent of rub-off of the printed image was observed with naked eyes, and evaluated on the basis of the following evaluation criteria:

[Evaluation Criteria]

⊚: Substantially no printed image being rubbed off, and its periphery being not stained.

◯: Some printed images being rubbed off, and its periphery being stained a little which would cause no problems in actual use.

x: Printed images being considerably rubbed off, its periphery being drastically blacked, and finger also being considerably stained.

TABLE 3

| Ex. No. | Aqueous Dispersion | Jetting Property and Blotting Resistance | Water Resistance | High Lighter-Fastness | Rubbing Resistance |
|---|---|---|---|---|---|
| 1 | Prep. Ex. 5 | ⊚ | ⊚ | ⊚ | ◯ |
| 2 | Prep. Ex. 6 | ⊚ | ◯ | ◯ | ◯ |
| 3 | Prep. Ex. 7 | ⊚ | ⊚ | ⊚ | ◯ |
| 4 | Prep. Ex. 8 | ⊚ | ⊚ | ⊚ | ◯ |
| 5 | Prep. Ex. 9 | ⊚ | ◯ | ◯ | ◯ |
| 6 | Prep. Ex. 10 | ⊚ | ⊚ | ⊚ | ◯ |
| Comp. Ex. 1 | Prep. Ex. 11 | x | Δ | Δ | x |
| Comp. Ex. 2 | Prep. Ex. 12 | x | Δ | Δ | x |

(Note)
Preparation Example No. listed in the column of "Aqueous Dispersion" means that the aqueous dispersion obtained in the Preparation Example was used.

It can be seen from the results shown in Table 3 that since the water-based inks obtained in Examples 1 to 6 contain the polymer having an ionic group at an end, the water-based inks are excellent in water resistance, high-lighter fastness and rubbing resistance, and also excellent in jetting property and blotting resistance when printed by using an inkjet printer.

Preparation Examples 13 to 17 (Preparation of Polymer Solutions)

A reaction vessel was charged with 30 parts by weight of methyl ethyl ketone, and monomers and a chain transfer agent in the kinds and amounts listed in the column of "initially charged monomers" of Table 4, and nitrogen gas replacement was sufficiently carried out.

On the other hand, a dropping funnel was charged with monomers and a chain transfer agent in the kinds and amounts listed in the column of "dropping monomers" of Table 4, 70 parts by weight of methyl ethyl ketone and a solution prepared by dissolving 0.1 parts by weight of 2,2'-azobis(2,4-dimethylvaleronitrile) in 5 parts by weight of methyl ethyl ketone. The mixture in the dropping funnel was added dropwise to the mixture in the reaction vessel, and the resulting mixture was aged at 70° C. for 5 hours, and then at 75° C. for 10 hours to give a polymer solution.

A part of the resulting polymer solution was dried under reduced pressure at 105° C. for 2 hours and isolated by removing the solvent therefrom. The weight-average molecular weight of the polymer was determined by gel permeation chromatography using polystyrene as a standard substance, and chloroform containing dodecyldimethylamine of 1 mmol/L as a solvent. As a result, the polymer had a weight-average molecular weight as shown in Table 4.

Each name listed in Table 4 means the followings:

Styrenic macromer: commercially available from TOAGOSEI CO., LTD. under the trade name of AS-6 (styrene homopolymerized macromer having a polymerizable functional group of methacryloyloxy group at one end, number-average molecular weight: 6000)

Monophenoxypolyethylene glycol(n=6) methacrylate: commercially available from Shin-Nakamura Chemical Co., Ltd. under the trade name of NK ESTER PHE-6G Monomethoxypolyethylene glycol(n=4) methacrylate: commercially available from Shin-Nakamura Chemical Co., Ltd. under the trade name of NK ESTER M-40G

TABLE 4

| Prep. Ex. No. | Initially Charged Monomers [Parts by Weight] | Dropping Monomers [Parts by Weight] | Weight-Average Molecular Weight |
|---|---|---|---|
| 13 | Methacrylic Acid [4] Styrene [19.4] Methyl Methacrylate [10] Styrenic Macromer [4] 3-Mercapto-1,2-propanediol [0.18] | Methacrylic Acid [6] Styrene [28] Methyl Methacrylate [28] 3-Mercapto-1,2-propanediol [0.32] | 17000 |
| 14 | Acrylic Acid [5] 2-Hydroxyethyl Methacrylate [4] Styrene [25] Styrenic Macromer [8] 6-Mercaptodiglycerol [0.4] | Acrylic Acid [8] 2-Hydroxyethyl Methacrylate [6] Styrene [40] Styrenic Macromer [2] 6-Mercaptodiglycerol [0.6] | 19400 |
| 15 | Acrylic Acid [5] 2-Hydroxyethyl Methacrylate [4] Monomethoxypolyethylene Glycol(n = 4) Methacrylate [3] Styrene [22] Styrenic Macromer [8] 1-Thio-β-D-glucose [0.4] | Acrylic Acid [8] 2-Hydroxyethyl Methacrylate [6] Monomethoxypolyethylene Glycol(n = 4) Methacrylate [3] Styrene [37] Styrenic Macromer [2] 1-Thio-β-D-glucose [0.6] | 20500 |
| 16 | Methacrylic Acid [8] 2-Hydroxyethyl Methacrylate [3] Monophenoxypolyethylene Glycol(n = 6) Methacrylate [8] | Methacrylic Acid [10] 2-Hydroxyethyl Methacrylate [4] Monophenoxypolyethylene Glycol(n = 6) Methacrylate [2] | 16000 |

TABLE 4-continued

| Prep. Ex. No. | Initially Charged Monomers [Parts by Weight] | Dropping Monomers [Parts by Weight] | Weight-Average Molecular Weight |
|---|---|---|---|
| 17 | Styrene [23.3]<br>Styrenic Macromer [8]<br>3-Mercapto-1,2-propanediol [0.3]<br>Methacrylic Acid [8]<br>2-Hydroxyethyl Methacrylate [3]<br>Monophenoxypolyethylene Glycol(n = 6) Methacrylate [8]<br>Styrene [23]<br>Styrenic Macromer [8]<br>Dodecylmercaptan [0.6] | Styrene [30]<br>Styrenic Macromer [2]<br>3-Mercapto-1,2-propanediol [0.4]<br>Methacrylic Acid [10]<br>2-Hydroxyethyl Methacrylate [4]<br>Monophenoxypolyethylene Glycol(n = 6) Methacrylate [2]<br>Styrene [29.6]<br>Styrenic Macromer [2]<br>Dodecylmercaptan [0.8] | 18500 |

(Note)
Each amount of the components inside the parenthesis [ ] is expressed by parts by weight.

Preparation Example 18 (Preparation of Aqueous Dispersion of Hydrophobic Dye-Containing Water-Insoluble Polymer Particles)

A hydrophobic dye shown in Table 5 and 100 g of toluene were added to 28 parts by weight of the polymer solution obtained in Preparation Example 13 (solid content of the polymer: 50% by weight). After the hydrophobic dye was completely dissolved, a neutralizing agent shown in Table 5 was added thereto to neutralize a salt-forming group of the polymer. Two-hundred parts by weight of ion-exchanged water was further added thereto, and the mixture was stirred. Thereafter, the mixture was dispersed by Microfluidizer commercially available from Microfluidizer Corp. for 30 minutes.

Methyl ethyl ketone, toluene and a part of water were distilled off from the resulting dispersion with an evaporator, to give an aqueous dispersion of hydrophobic dye-containing water-insoluble polymer particles, the solid content of which was 20% by weight. The average particle diameter of the hydrophobic dye-containing water-insoluble polymer particles was determined on the basis of the above-mentioned method. The results are shown in Table 5.

The aqueous dispersion obtained in Preparation Example 18 is an aqueous dispersion of hydrophobic dye-containing water-insoluble polymer particles, since 70% by mol of the methacrylic acid moiety of the polymer is neutralized, and the polymer exhibits water insolubility.

The method for determining for the average particle diameter of the water-insoluble polymer particles is as described above.

Preparation Examples 19 to 22 (Preparation of Pigment-Containing Water-Insoluble Polymer Particles)

A pigment, methyl ethyl ketone, ion-exchanged water and a neutralizing agent listed in Table 5 were added to 28 parts by weight of the polymer solution (solid content of the polymer: 50% by weight) obtained in Preparation Example 14, 15, 16 or 17, and the resulting mixture was sufficiently stirred. Thereafter, the mixture was kneaded twenty times with a triple-roll mill commercially available from NORI-TAKE CO., LIMITED under the trade name of NR-84A.

The resulting paste was added to 250 parts by weight of ion-exchanged water, and the mixture was sufficiently stirred. Thereafter, methyl ethyl ketone and a part of water were distilled off using an evaporator, to give an aqueous dispersion of pigment-containing water-insoluble polymer particles, the solid content of which was 20% by weight. The determination results for the average particle diameter of the aqueous dispersion of the pigment-containing water-insoluble polymer particles are shown in Table 5.

Each name listed in Table 5 means the followings:

Magenta dye: commercially available from Orient Chemical Co., Ltd. under the trade name of Oil Pink 312

Carbon black: commercially available from Degussa under the trade name of Color Black FW18

Cyan pigment: commercially available from DAINIPPON INK & CHEMICALS, INC. under the trade name of Fastogen Blue TGR-SD

TABLE 5

| Prep. Ex. No. | Polymer | Pigment/Dye | Methyl Ethyl Ketone | Ion-Exchanged Water | Neutralizing Agent | Average Particle Diameter (nm) |
|---|---|---|---|---|---|---|
| 18 | Prep. Ex. 13 | Magenta Dye [14] | [126] | [200] | 30% Aqueous NaOH [1.5] | 110 |
| 19 | Prep. Ex. 14 | Cyan Pigment [21] | [30] | [5] | 30% Aqueous NaOH [2.4] | 121 |
| 20 | Prep. Ex. 15 | Cyan Pigment [21] | [30] | [5] | 30% Aqueous NaOH [2.4] | 115 |

TABLE 5-continued

| Prep. Ex. No. | Polymer | Pigment/Dye | Methyl Ethyl Ketone | Ion-Exchanged Water | Neutralizing Agent | Average Particle Diameter (nm) |
|---|---|---|---|---|---|---|
| 21 | Prep. Ex. 16 | Carbon Black [26] | [30] | [5] | 30% Aqueous NaOH [2.7] | 132 |
| 22 | Prep. Ex. 17 | Carbon Black [26] | [30] | [5] | 30% Aqueous NaOH [2.7] | 136 |

(Note)
Preparation Example No. listed in the column of "Polymer" means that the polymer obtained in the Preparation Example was used.
Amounts of each component inside the parenthesis [ ] are expressed by parts by weight.

Examples 7 to 10

There were mixed together 20 parts by weight of the aqueous dispersion of colorant-containing vinyl polymer particles obtained in Preparation Example 18, 19, 20 or 21, 8 parts by weight of glycerol, 5 parts by weight of polyethylene glycol (molecular weight: 800), 0.2 parts by weight of acetylene glycol-polyethylene oxide adduct commercially available from Kawaken Fine Chemicals Co., Ltd. under the trade name of Acetylenol EH and 66.8 parts by weight of ion-exchanged water. The resulting liquid mixture was filtered with a membrane filter (commercially available from Fuji Photo Film Co., Ltd., under the trade name of "Disc Capsule CALC120 2.5CMD 50") having a pore diameter of 1.2 μm, to give water-based inks.

Example 11

There were mixed together 10 parts by weight of the polymer emulsion obtained in Preparation Example 16 not containing a colorant (an aqueous dispersion in which 70% by mol of methacrylic acid of the polymer was neutralized, a solid content of which is 20% by weight, average particle diameter: 140 nm), 26 parts by weight of self-dispersible carbon black (aqueous dispersion, solid content of which is 15% by weight, commercially available from Cabot Corporation under the trade name of CAB-O-JET TM300), 8 parts by weight of glycerol, 5 parts by weight of polyethylene glycol (molecular weight: 800), 0.2 parts by weight of acetylene glycol-polyethylene oxide adduct commercially available from Kawaken Fine Chemicals Co., Ltd. under the trade name of Acetylenol EH and 50.8 parts by weight of ion-exchanged water. The resulting liquid mixture was filtered with a membrane filter (commercially available from Fuji Photo Film Co., Ltd., under the trade name of "Disc Capsule CALC120 2.5CMD 50") having a pore diameter of 1.2 μm, to give a water-based ink.

Comparative Example 3

The same procedures as in Example 7 were carried out except that the aqueous dispersion of colorant-containing vinyl polymer particles was changed to the aqueous dispersion of water-insoluble polymer particles obtained in Preparation Example 22 to give a water-based ink.

Next, the physical properties of the water-based inks obtained in each of Examples and Comparative Examples were evaluated in accordance with the methods described above. The results are shown in Table 6.

TABLE 6

| Ex. No. | Kind of Aqueous Dispersion | Jetting Property and Blotting Resistance | Water Resistance | High Lighter-Fastness | Rubbing Resistance |
|---|---|---|---|---|---|
| 7 | Prep. Ex. 18 | ○ | ◎ | ◎ | ◎ |
| 8 | Prep. Ex. 19 | ○ | ◎ | ◎ | ○ |
| 9 | Prep. Ex. 20 | ◎ | ◎ | ◎ | ○ |
| 10 | Prep. Ex. 21 | ◎ | ◎ | ◎ | ○ |
| 11 | Prep. Ex. 16 | ◎ | ◎ | ○ | ○ |
| Comp. Ex. 3 | Prep. Ex. 22 | x | ◎ | ◎ | ○ |

(Note)
Preparation Example No. listed in the column of "Kind of Aqueous Dispersion" means the aqueous dispersion obtained in each of Examples and Comparative Example was used.

It can be seen the results shown in Table 6 that the water-based ink obtained in each Example is excellent in jetting property, blotting resistance, water resistance, highlighter fastness and rubbing resistance.

As explained above, according to the present invention, there are exhibited some effects that the water-based ink is excellent in water resistance, high-lighter fastness and rubbing resistance, and also excellent in jetting property when printed with an inkjet printer.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water-based ink comprising a colorant comprising a pigment and a water-insoluble polymer having at least two hydroxyl groups at its end, wherein the colorant is contained in particles of the water-insoluble polymer having at least two hydroxyl groups at its end
   wherein the water-insoluble polymer is obtained by copolymerizing a monomer mixture comprising (A) a salt-forming group-containing monomer, (B) a macromer, and (C) a monomer copolymerizable with the salt-forming group-containing monomer and the macromer.

2. The water-based ink according to claim 1, wherein the hydroxyl group existing at the end of the water-insoluble polymer is derived from a chain transfer agent having at least two hydroxyl groups.

3. The water-based ink according to claim 2, wherein the chain transfer agent is a mercapto-group containing chain transfer agent.

4. The water-based ink according to claim 2, wherein the chain transfer agent is 3-mercapto-1,2-propanediol or 1-thio-β-D-glucose.

5. A process for preparing a water-based ink, comprising dissolving a water-insoluble polymer having an ionic group at its end in an organic solvent; adding a pigment, water and a neutralizing agent, and optionally a surfactant to the resulting solution; kneading the mixture to form a paste; and distilling off the organic solvent to make it into a water-based system, wherein the water-based ink comprises an aqueous dispersion of particles of pigment-containing water-insoluble polymer having an ionic group at its end wherein the ionic group is an ionic group derived from at least one member selected from the group consisting of a chain transfer agent having an ionic group, and an iniferter having an ionic group and the functions of a chain transfer agent and a polymerization initiator.

6. The process according to claim 5, wherein the ionic group is an ionic group derived from a chain transfer agent having an ionic group and is at least one member selected from the group consisting of thioglycollic acid, mercaptopropionic acid and mercaptosuccinic acid.

7. The process according to claim 5, wherein the water-insoluble polymer is obtained by copolymerizing a monomer mixture comprising (A) a salt-forming group-containing monomer, (B) a macromer, and (C) a monomer copolymerizable with the salt-forming group-containing monomer and the macromer.

8. The process according to claim 7, wherein the monomer mixture further comprises at least one monomer selected from the group consisting of (D) a hydroxyl group-containing monomer, and (E) a monomer represented by the formula (1):

$$CH_2C\!\!=\!\!C(R^1)COO(R^2O)_pR^3 \qquad (I)$$

wherein $R^1$ is a hydrogen atom or a lower alkyl group having 1 to 5 carbon atoms; $R^2$ is a divalent hydrocarbon group having 1 to 30 carbon atoms which optionally has a hetero atom; $R^3$ is a hydrogen atom or a monovalent hydrocarbon group having 1 to 30 carbon atoms which may have a hetero atom; and p is a number of 1 to 60.

9. The water-based ink according to claim 1, wherein the monomer mixture further comprises at least one monomer selected from the group consisting of (D) a hydroxyl group-containing monomer, and (E) a monomer represented by the formula (1):

$$CH_2C\!\!=\!\!C(R^1)COO(R^2O)_pR^3 \qquad (I)$$

wherein $R^1$ is a hydrogen atom or a lower alkyl group having 1 to 5 carbon atoms; $R^2$ is a divalent hydrocarbon group having 1 to 30 carbon atoms which optionally has a hetero atom; $R^3$ is a hydrogen atom or a monovalent hydrocarbon group having 1 to 30 carbon atoms which may have a hetero atom; and p is a number of 1 to 60.

10. A process for preparing a water-based ink, comprising dissolving a water-insoluble polymer having an ionic group at its end in an organic solvent; adding a pigment, water and a neutralizing agent, and optionally a surfactant to the resulting solution; kneading the mixture to form a paste; and distilling off the organic solvent to make it into a water-based system, wherein the water-based ink comprises an aqueous dispersion of particles of pigment-containing water-insoluble polymer having an ionic group at its end wherein the ionic group is an ionic group derived from at least one member selected from the group consisting of a chain transfer agent having an ionic group, a polymerization initiator having an ionic group, and an iniferter having an ionic group and the functions of the chain transfer agent and the polymerization initiator, wherein the water-insoluble polymer is obtained by copolymerizing a monomer mixture comprising (A) a salt-forming group-containing monomer, (B) a macromer, and (C) a monomer copolymerizable with the salt-forming group-containing monomer and the macromer.

11. The process according to claim 10, wherein the monomer mixture further comprises at least one monomer selected from the group consisting of (D) a hydroxyl group-containing monomer, and (E) a monomer represented by the formula (1):

$$CH_2C\!\!=\!\!C(R^1)COO(R^2O)_pR^3 \qquad (I)$$

wherein $R^1$ is a hydrogen atom or a lower alkyl group having 1 to 5 carbon atoms; $R^2$ is a divalent hydrocarbon group having 1 to 30 carbon atoms which optionally has a hetero atom; $R^3$ is a hydrogen atom or a monovalent hydrocarbon group having 1 to 30 carbon atoms which may have a hetero atom; and p is a number of 1 to 60.

12. A process for preparing the water-based ink of any one of claims 1-3, 4 and 9, comprising dissolving a water-insoluble polymer having at least two hydroxyl groups at its end in an organic solvent; adding a pigment, water and a neutralizing agent, and optionally a surfactant to the resulting solution; kneading the mixture to form a paste; and distilling off the organic solvent to make it into a water-based system.

* * * * *